(12) United States Patent
Robinson

(10) Patent No.: US 7,360,709 B2
(45) Date of Patent: Apr. 22, 2008

(54) DEVICE FOR LOCKING A CARD IN A CARD READER

(75) Inventor: Carl Wesley Robinson, Charlotte, NC (US)

(73) Assignee: XAC Automation Corp., Hsinchu (TW)

( * ) Notice: Subject to any disclaimer, the term of this patent is extended or adjusted under 35 U.S.C. 154(b) by 445 days.

(21) Appl. No.: 11/034,063

(22) Filed: Jan. 13, 2005

(65) Prior Publication Data

US 2006/0151611 A1    Jul. 13, 2006

(51) Int. Cl.
*G06K 13/00* (2006.01)
(52) U.S. Cl. .................. 235/475; 235/479; 235/483; 235/486
(58) Field of Classification Search ............... 235/479, 235/441, 475, 483, 486
See application file for complete search history.

(56) References Cited

U.S. PATENT DOCUMENTS 6,367,700 B1 * 4/2002 Kanayama et al. ......... 235/475
6,464,143 B2 * 10/2002 Oki et al. ................... 235/475
6,951,473 B2 * 10/2005 Takahashi et al. .......... 439/327

* cited by examiner

*Primary Examiner*—Seung Ho Lee
(74) *Attorney, Agent, or Firm*—Oliff & Berridge, PLC

(57) ABSTRACT

A device is capable of locking or unlocking a card in a card reader. An actuator carries a drive bushing onto which one end of a coil spring is mounted such that the axis of the coil spring is approximately parallel to the rotation axis of the actuator. The opposite end of the coil spring is mounted on a drive nut. A threaded shaft is fixed to a slide block with an elongated hole, and the movements of both are constrained to a single degree of freedom by the engagement of the elongated hole with a fixed pin and by the engagement of an extension of the threaded shaft with the inner hole of the drive bushing. The linear movement of the slide block causes a latch plate to move by means of a linear sliding pair between them so as to lock or unlock the inserted card.

20 Claims, 4 Drawing Sheets

DEVICE FOR LOCKING A CARD IN A CARD READER

BACKGROUND OF THE INVENTION

1. Field of the Invention

The present invention relates to a device for locking a card in a card reader, and more particularly, to a locking mechanism included in a card reader capable of reading ID cards such as integrated circuit (IC) cards. ID cards of this type are typically compliant with ISO 7816 standards.

2. Description of the Related Art

IC cards are small plastic devices which contain one or more embedded integrated circuits for storing a user's personal data and for executing software to run business transaction applications. An IC card is programmed and the personal data is accessed with a card reader that has an aperture or slot into which the IC card is inserted. Terminals within the slot connect to terminals on the IC card to provide power and data connections for operating the IC card.

The current card readers usually use mechanical locking mechanisms to prevent the user from removing their card before a transaction is completed. These mechanisms typically employ a solenoid or DC motor to drive a linkage connected to a latch. Several problems exist in the aforesaid locking mechanisms and involve the situations when the user's card is interfering with the operation of the latch. In one case, the user may insert the IC card completely into the card reader such that the locking mechanism is activated, but is able to withdraw the IC card to a point where it is blocking the latch before the latch reaches its locking position. That is, the fully inserted IC card would trigger the locking motion of the latch; however, the latch cannot instantly reach the locking position so the user can withdraw the IC card to a blocking position before the latch reaches the locked position.

In a second case, the user is pulling on the IC card with sufficient force against the latch so that when the locking mechanism is triggered to unlock the IC card, the latch is unable to move to the unlocked position. Regarding these situations, it is necessary to continuously drive the solenoid or DC motor until it is determined by sensor feedback that the desired locking state has been achieved. The power and extra sensors required increase the cost and complexity of these mechanisms.

SUMMARY OF THE INVENTION

An objective of the present invention is to provide a device for locking a card in a card reader. The device employs an energy-storing coil in the linkage between an actuator and the latch. The energy-storing coil allows for a single drive pulse to the actuator to achieve the desired locking state. The energy stored in the element drives the latch to the desired position when the user moves the card away from an interfering position.

To achieve the objectives, the present invention discloses a device for locking a card in a card reader. An actuator carries a drive bushing onto which one end of an energy-storing coil is mounted such that the axis of the coil spring is approximately parallel to the rotation axis of the actuator. The opposite end of the energy-storing coil is mounted on a drive nut. A threaded shaft is fixed to a slide block with an elongated hole, and the movements of both are constrained to a single degree of freedom by the engagement of the elongated hole with a fixed pin and by the engagement of an extension of the threaded shaft with the inner hole of the drive bushing. The linear movement of the slide block causes a latch plate to move by means of a linear sliding pair between them so as to lock or unlock the inserted card.

BRIEF DESCRIPTION OF THE DRAWINGS

The invention will be described according to the appended drawings in which.

PREFERRED EMBODIMENT OF THE PRESENT INVENTION

Figure 1:
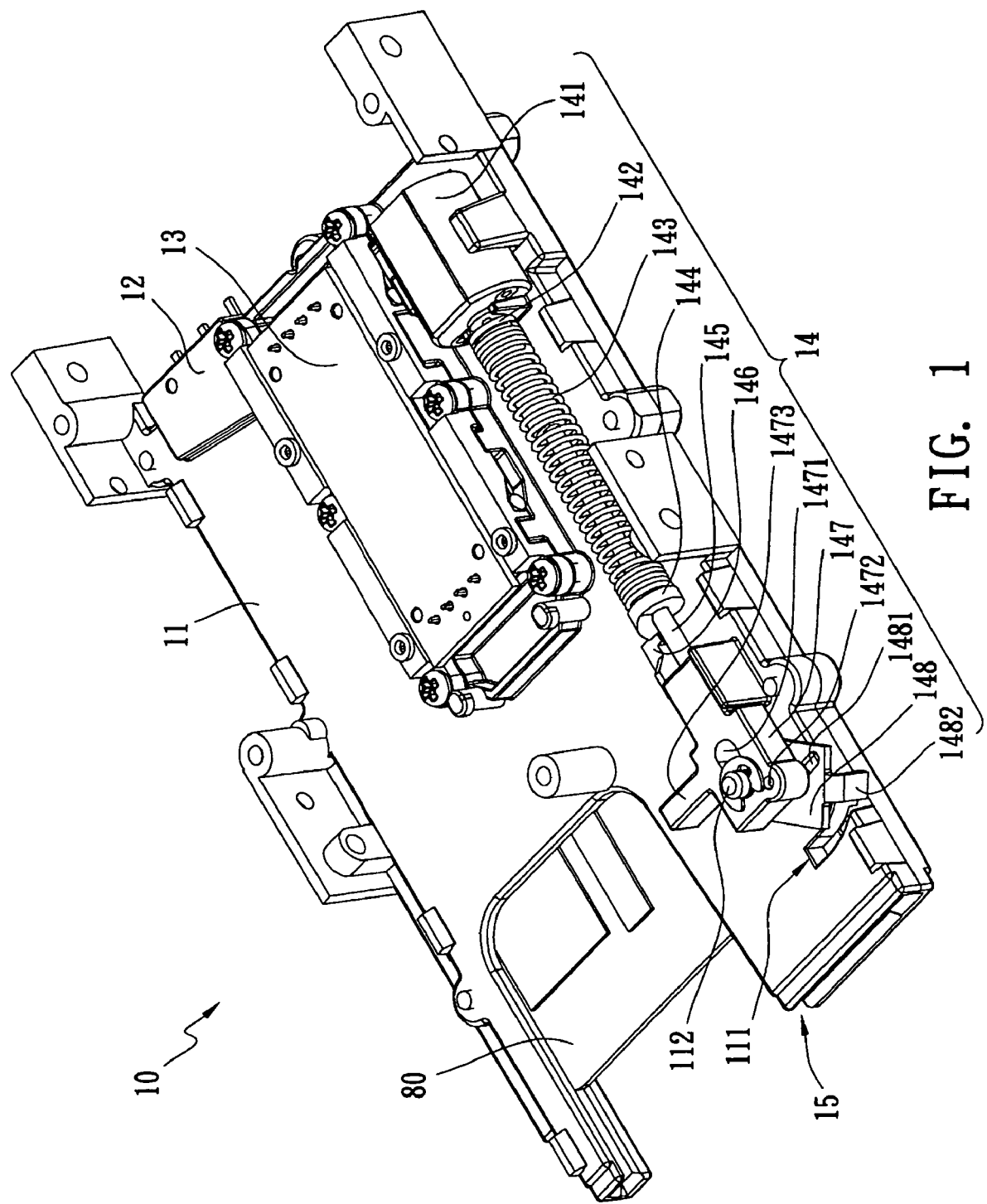
FIG. 1 is a perspective diagram of a card reader with a locking mechanism in an unlocked state in accordance with the present invention.

FIG. 1 is a perspective diagram of a card reader 10 with a locking mechanism 14 in an unlocking state in accordance with the present invention. Referring to the preferred embodiment, a frame 11 with an insertion slot 15 for receiving an IC card 80 is equipped with an IC contact module 13 for making electrical connection to the contacts on the inserted IC card 80. A micro switch 12 at the bottom of the insertion slot 15 is used to detect whether the IC card 80 is fully inserted. A DC motor 141, a torque-output actuator, is mounted to the frame 11 and carries a drive bushing 142 onto which one end of a coil spring 143, an energy-storing coil element, is engaged by an interference fit, such that the axis of the coil spring 143 is generally parallel to the rotation axis of the DC motor 141. Apparently, many fasteners such as a set screw could also be used to firmly join the drive bushing 142 and coil spring 143 together instead of the interference fit. The other end of the coil spring 143 is engaged by an interference fit with a drive nut 144 having threaded hole whose axis is substantially parallel to the axis of the coil spring 143.

Figure 4:
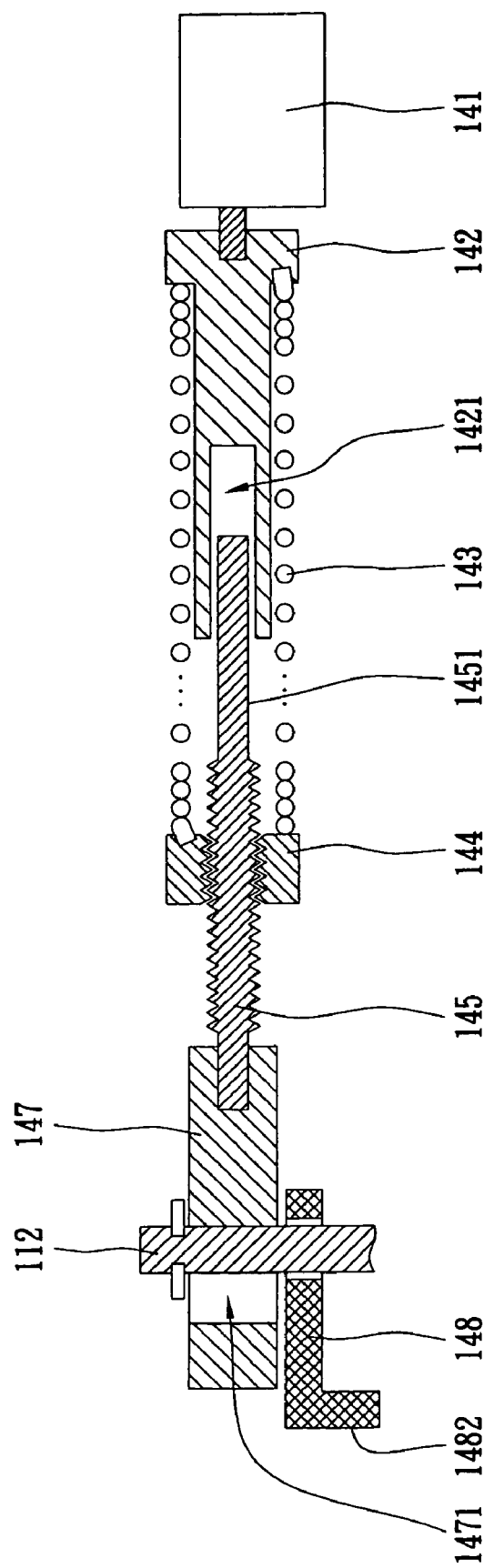
FIG. 4 is a cross-sectional diagram of the locking mechanism along the line 2-2 in FIG. 3.

A threaded shaft 145 is fixed to a sliding block 147 with an elongated hole 1471, and the movements of both are constrained to a single degree of freedom by the engagement of the elongated hole 1471 with a fixed pin 112 fixed to the frame 11 and by the engagement of an extension 1451 (as shown in FIG. 4) of the threaded shaft 145 with the inner hole 1421 of the drive bushing 142. That is, the extension 1451 can slide against the wall of the inner hole 1421, acting as a sliding pair on kinematics.

A guide pin 1472 is fixed to the bottom of the slide block 147, and is engaged with a slot 1481 on a latch plate 148 pivoted on the fixed pin 112. Therefore, motion of the slide block 147 causes the latch plate 148 to swing according to the joint of a sliding pair between them.

A tab 1473 on the slide block 147 can be used to manually unlock the locking mechanism 14 by push force toward the DC motor 141. The coil spring 143 is compressed and the unlocked state is maintained while the push force is sufficient to move the tab 1473.

Figure 2:
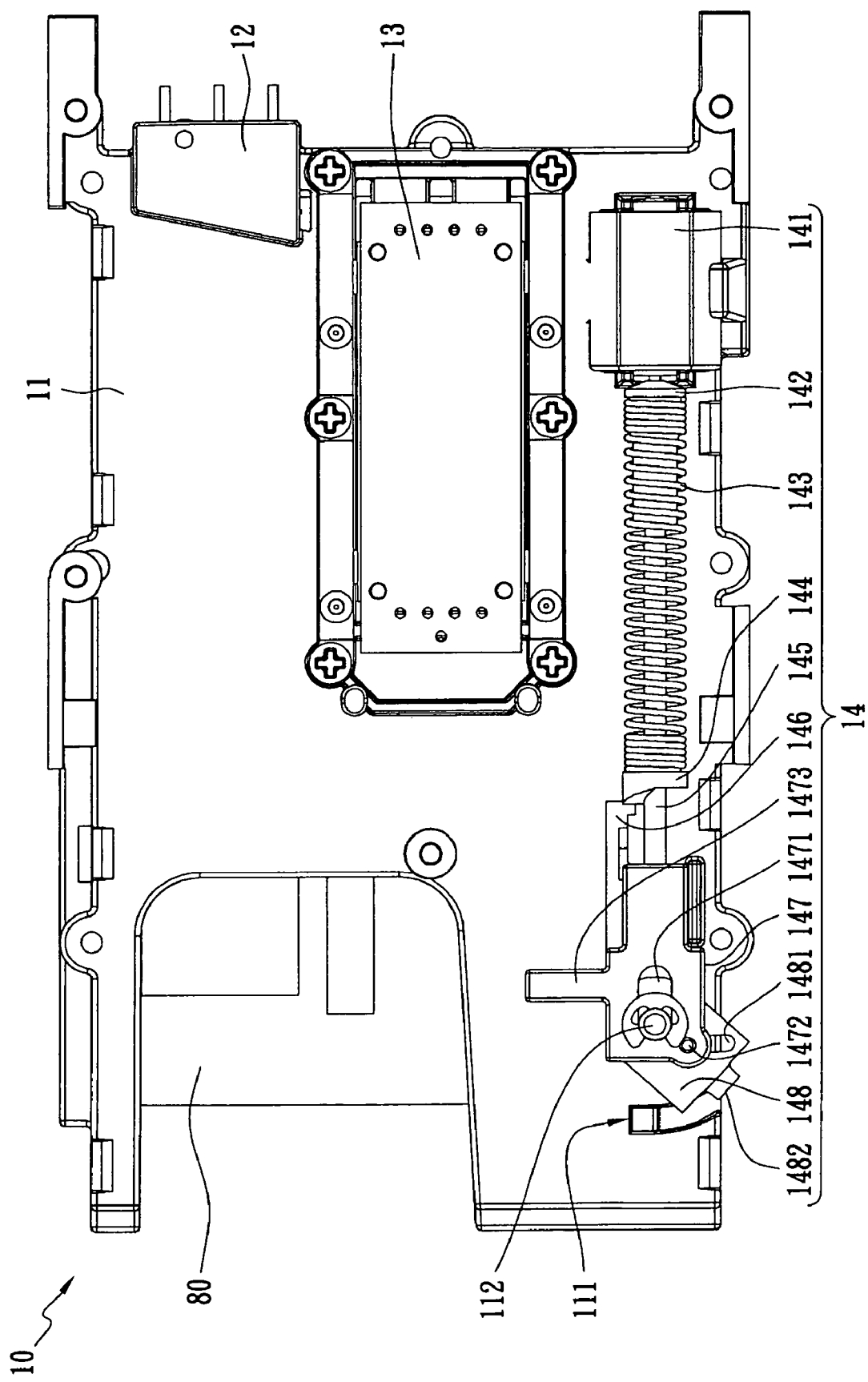
FIG. 2 is a top view of the card reader in FIG. 1.

FIG. 2 is a top view of the card reader 10 in FIG. 1. The card reader 10 is in an unlocked state because the slide block 147 at a position closest to the DC motor 141 causes the latch 1482 of the latch plate 148 to be far from the inserted IC card 80.

Figure 3:
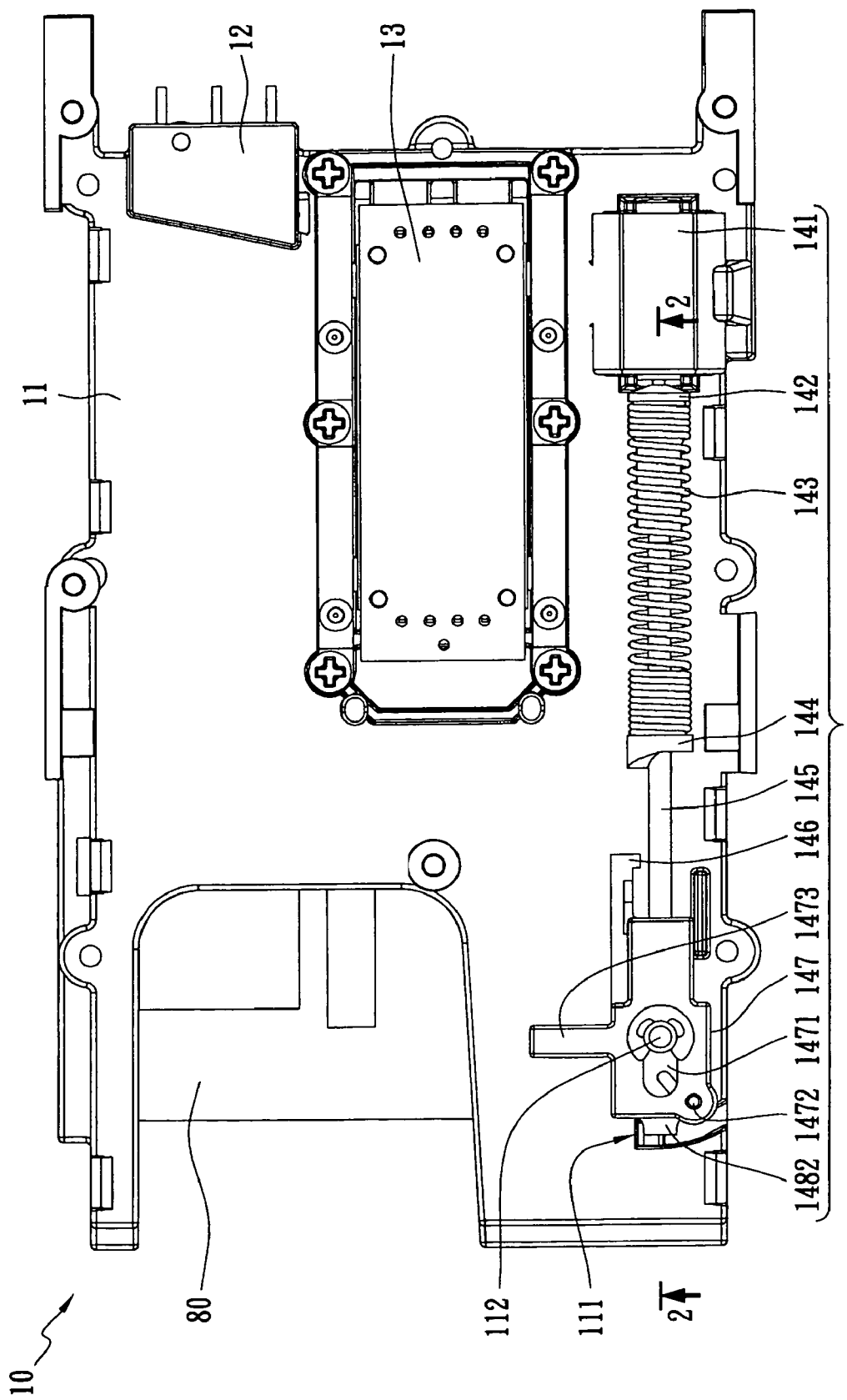
FIG. 3 is a top view of the card reader in a locked state.

As shown in FIG. 3, when the card reader 10 is changed into a locked state, the latch plate 148 clockwise rotates around the fixed pin 112 to have the latch 1482 move into a groove 111 on the frame 11. At last the slide block 147 is at a position that is farthest from the DC motor 141. The DC motor 141 is energized to have a clockwise rotation as view from the insertion direction of the IC card 80; hence the drive bushing 142, coil spring 143 and drive nut 144 also rotate clockwise simultaneously. Rotation of the drive nut 144 causes it to linearly move in a direction parallel to the axis of the threaded shaft 145. The motion of the drive nut 144 in the counterclockwise direction is limited by a rotational stopper 146 between the drive nut 144 and the slide block 147. The rotational manner of the rotational stopper 146 eliminates any axial loads between the drive nut 144 and the slide block 147. The rotational stopper 146 also provides a known end point for the drive nut 144 as a result of energizing the DC motor 141 in the counterclockwise or unlocking direction.

To ensure that the drive nut 144 always reaches the accurate stop position under an unlocked state, the unlocking drive pulse to the DC motor 141 is longer than the locking drive pulse. When the drive nut 144 is blocked by the rotational stopper 146 at the stop position, the coil spring 143 is extended from its free length to ensure the latch plate 148 is held in an unlocked state. As the drive nut 144 moves away from the rotational stopper 146, the coil spring 143 returns to its free length and then the slide block 147 and the latch plate 148 move from the unlocked position to the locked position if no external interference blocks the motion of the latch plate 148, as shown in FIG. 4. When the slide block 147 and latch plate 148 reach the locked position, the drive nut 144 continues to rotate and compress the coil spring 143 for the remaining duration of the clockwise drive pulse to the DC motor 141. If external interference with the latch 1482 of the latch plate 148 is encountered during either the locking or unlocking drive pulse, the drive nut 144 can compress or extend the coil spring 143 sufficiently such that when the interference is removed, the energy stored in the coil spring 143 can complete the locking or unlocking operation.

The above-described embodiments of the present invention are intended to be illustrative only. Numerous alternative embodiments may be devised by persons skilled in the art without departing from the scope of the following claims.

What is claimed is:

1. A device for locking a card in a card reader, comprising:
   an actuator for outputting torque;
   a drive bushing with an inner hole being rotated by the torque;
   an energy-storing coil including a first end fixed to the drive bushing;
   a drive nut fixed to a second end of the energy-storing coil;
   a threaded shaft engaged with the drive nut and having an extension sliding along the inner hole of the drive bushing;
   a fixed pin;
   a slide block with an elongated hole fixing the threaded shaft and constrained to linear sliding motion by the engagement of the fixed pin with the elongated hole and by the engagement of the threaded shaft with the drive bushing; and
   a latch plate pivoted on the fixed pin and moving to either a locked position or an unlocked position according to the direction of the linear sliding motion.

2. The device for locking a card in a card reader of claim 1, wherein the axis of the energy-storing coil is approximately parallel to the torque-outputting axis of the actuator.

3. The device for locking a card in a card reader of claim 1, wherein the actuator is a DC motor.

4. The device for locking a card in a card reader of claim 1, wherein the energy-storing coil is a coil spring capable of storing mechanical energy.

5. The device for locking a card in a card reader of claim 1, wherein the axis of the drive nut is approximately parallel to the axis of the energy-storing coil.

6. The device for locking a card in a card reader of claim 1, wherein the drive nut has a threaded hole engaged with the threaded shaft.

7. The device for locking a card in a card reader of claim 1, wherein the fixed pin is engaged with the elongated hole of the slide block.

8. The device for locking a card in a card reader of claim 1, wherein the linear sliding motion of the slide block is along the axis of the energy-storing coil.

9. The device for locking a card in a card reader of claim 1, further comprising a rotational stopper for preventing the drive nut from being collided with the slide block.

10. The device for locking a card in a card reader of claim 1, wherein the latch plate interferes with a card in the card reader in the locked position.

11. The device for locking a card in a card reader of claim 1, wherein the slide block further includes a guide pin engaged with a slot of the latch plate.

12. The device for locking a card in a card reader of claim 11, wherein the guide pin slides along the longitudinal direction of the slot to move the latch plate.

13. The device for locking a card in a card reader of claim 1, wherein the slide block further includes a tab for manually releasing the slide block from the locked position.

14. The device for locking a card in a card reader of claim 1, wherein the actuator is controlled by an unlocking drive pulse and a locking drive pulse to respectively output locking torque and unlocking torque, and the interval of the unlocking drive pulse to the actuator is longer than that of the locking drive pulse.

15. The device for locking a card in a card reader of claim 14, wherein the drive nut continues to rotate and force the energy-storing coil for the remaining duration of the locking drive pulse to the actuator after the latch plate reaches the locked position.

16. The device for locking a card in a card reader of claim 14, wherein if external interference with the latch plate is encountered during either the locking drive pulse and unlocking drive pulse, the drive nut continues to rotate and force the energy-storing coil sufficiently such that the energy stored in the energy-storing coil can drive the latch plate to reach the locked position or unlocked position.

17. A device for locking a card in a card reader, comprising:
   an actuator for driving the device between a locked and unlocked state;
   a latch for locking the card in the reader, having a locked and unlocked position; and
   a linkage including an energy-storing element directly driven by the actuator, and Permitting relative sliding motion between members of the linkage for moving the latch between the locked and unlocked position, wherein the energy of the actuator is stored in the energy-storing element when the motion of the latch is blocked by the card and released when the card is moved to a position where the card does not block the latch.

18. The device for locking a card in a card reader of claim 17, wherein the linkage further includes a drive bushing with an inner hole mounted on an outputting shaft of the actuator and fixed to the energy-storing element, a drive nut opposite to the drive bushing and fixed to energy-storing element, a threaded shaft engaged with the drive nut and having an extension sliding along the inner hole of the drive bushing, a fixed pin, and a slide block with an elongated hole fixing the threaded shaft and constrained to linear sliding motion by the engagement of the fixed pin with the elongated hole and by the engagement of the threaded shaft with the drive bushing.

19. The device for locking a card in a card reader of claim 18, wherein the latch is pivoted on the fixed pin and moving to either the locked position or the unlocked position according to the direction of the linear sliding motion.

20. The device for locking a card in a card reader of claim 17, wherein the energy-storing element is a coil spring capable of storing mechanical energy.

* * * * *